US008879997B2

(12) United States Patent
Barker et al.

(10) Patent No.: US 8,879,997 B2
(45) Date of Patent: Nov. 4, 2014

(54) METHOD AND APPARATUS FOR ANTENNA RADIATION CROSS POLAR SUPPRESSION

(75) Inventors: David Edwin Barker, Stockport (GB);
David Sam Piazza, San Jose, CA (US);
Stephen Thomas Newbold, Holmer Green (GB)

(73) Assignee: Quintel Technology Limited, Bristol (GB)

( * ) Notice: Subject to any disclaimer, the term of this patent is extended or adjusted under 35 U.S.C. 154(b) by 394 days.

(21) Appl. No.: 13/429,042

(22) Filed: Mar. 23, 2012

(65) Prior Publication Data
US 2012/0244899 A1    Sep. 27, 2012

Related U.S. Application Data

(60) Provisional application No. 61/467,915, filed on Mar. 25, 2011.

(51) Int. Cl.
| H04B 1/00 | (2006.01) |
| H04B 7/10 | (2006.01) |
| H01Q 1/24 | (2006.01) |
| H04B 7/04 | (2006.01) |

(52) U.S. Cl.
CPC .............. *H04B 7/10* (2013.01); *H04B 7/0469* (2013.01); *H04B 7/0413* (2013.01); *H01Q 1/246* (2013.01)
USPC ..................... 455/63.1; 455/67.13; 455/114.2

(58) Field of Classification Search
USPC ......................... 455/63.1, 67.13, 114.1, 114.2
See application file for complete search history.

(56) References Cited

U.S. PATENT DOCUMENTS

| 4,723,321 A | 2/1988 | Saleh |
| 2003/0050020 A1 | 3/2003 | Erceg et al. |
| 2003/0179137 A1 | 9/2003 | White et al. |
| 2010/0278155 A1 | 11/2010 | Luo et al. |

OTHER PUBLICATIONS

PCT Search Report and Written Opinion for International Patent Application Serial No. PCT/US2012/030418, mailed Jun. 28, 2012, consists of 10 unnumbered pages.
Coldrey, "Modeling and Capacity of Polarized MIMO Channels," *IEEE Vehicular Technology Conference*, May 11, 2008, pp. 440-445. URL: http://mnet.skku.ac.kr/data/2008/VTC2008/Data/02-05-06.PDF.
3G America, "MIMO and Smart Antennas for 3G and 4G Wireless Systems," May 2010, pp. 1-135. URL: http://www.3gamericas.org/documents/mimo_and_smart_antennas_for_3g_and_4g_wireless_systems_May%202010%Final.pdf.
"MIMO in LTE Operation and Measurement—Excerpts on LTE Test," Jan. 25, 2010, Agilent Technologies, pp. 1-25. URL: http://cp.literature.agilent.com/litweb/pdf/5990-4760EN.pdf.
EP Search Report for corresponding EP Application No. 12 765 944.9, dated Jul. 28, 2014, pp. 1-7.

*Primary Examiner* — Raymond Dean (57) ABSTRACT

Cross-polar discrimination (XPD) of a dual orthogonal cross-polarized antenna is maximized via a cross-coupling network between base station MIMO branches prior to connection to the base station antenna. In one embodiment, a cross coupling network combines each MIMO branch signal with an attenuated phase reversed (phase shifted) copy of the other MIMO branch signal. The amount of attenuation for each branch is equivalent to the cross polar suppression required for each antenna array. The cross-coupling can be applied at different stages of signal processing within a base station.

20 Claims, 9 Drawing Sheets

METHOD AND APPARATUS FOR ANTENNA RADIATION CROSS POLAR SUPPRESSION

CROSS REFERENCE TO RELATED APPLICATIONS

This application claims the benefit of U.S. Provisional Patent Application Ser. No. 61/467,915, filed Mar. 25, 2011, which is herein incorporated by reference in its entirety.

The present disclosure relates generally to the field of cellular communications, and more specifically relates to maximizing cross polar discrimination of a dual orthogonal cross polarized antenna.

BACKGROUND

Cross Polar Discrimination (XPD) of an antenna element or antenna array is a measure of the ability of the array to radiate on its intended polarisation and not into its orthogonal (or cross) polarisation. Radiated power into the orthogonal polarisation (and hence degradation of XPD performance) can be caused by a number of factors including radiation from the corporate feed network, radiation from the element/corporate feed junction/balun network, the fact an X or cross shape is used for the dual polarised element(s) (and hence existence of mutual coupling to a co-incident orthogonal polarised radiating structure within the near field), the chassis, mutual-coupling to other close-by radiating arrays and the fact that wideband operation of an element often implies radiating structure thickness (or departure from pure slant radiating element). Furthermore, antenna arrays which are designed to provide Variable Electrical Tilt (VET) can exhibit varying XPD performance due to varying phase and resulting mutual coupling components between array elements. Similarly, at the mobile terminal, the antenna often needs to have wide or multi-band capability and the existence of proximate physical objects within the near field coupling range of the X-Polar antenna such as a user's hand will also degrade XPD performance.

Therefore, good XPD can prove to be a difficult optimisation exercise when designing antennas for wide bandwidth, multi-band operation and with VET, for base station antennas. Commercial wideband/multi-band VET antennas may achieve <15 dB XPD at boresight that diminishes away from boresight.

SUMMARY

In one embodiment, the present disclosure maximizes cross-polar discrimination (XPD) of a dual orthogonal cross-polarised antenna via a cross-coupling network between base station MIMO branches prior to connection to the base station antenna. In one embodiment, a cross coupling network combines each MIMO branch signal with an attenuated phase reversed (phase shifted) copy of the other MIMO branch signal. The amount of attenuation for each branch is equivalent to the cross polar suppression required for each antenna array. In various embodiments, the cross-coupling is applied at different stages of signal processing within a base station.

In one embodiment, the system comprises a base station with two Multiple In-Multiple Out (MIMO) RF ports and a cross-coupling network configured to vectorially combine power from each of the MIMO RF port to the other MIMO RF port, wherein the cross-coupling network comprises two input ports and two output ports, where a first input signal on one of two input ports is split into two component signals having a variable power difference between the two component signals, wherein one of the two component signals receiving a variable phase delay to generate a first delayed component signal, where a second input signal on one of two input ports is split into two component signals having a variable power difference between the two component signals, wherein one of the two component signals receiving a variable phase delay to generate a second delayed component signal, wherein an un-delayed component signal associated with the first input signal is combined with the second delayed component signal associated with the second input signal, wherein the un-delayed component signal associated with the second input signal is combined with the first delayed component signal associated with the first input signal.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure provides a cross polar suppression technique which can be used with a wide and diverse range of physical antenna designs, wide bandwidth, wide range of azimuth angles, and tilt angles. In one embodiment, the present disclosure finds particular benefit for inclusion in large scale antenna manufacturing and for use in non-dispersive radio channels where the antenna, rather than the radio channel, can be XPD limiting. By optimising base station antenna XPD, this ensures strong Multiple In-Multiple Out (MIMO) branch isolation in non-dispersive radio channels to which MIMO performance can be maximized.

Many mobile operators are now exploiting or looking to exploit Multiple In-Multiple Out (MIMO) antenna technology to enhance spectral efficiency and capacity. For example, radio access technologies using MIMO include Evolved High-Speed Packet Access (HSPA+), Long Term Evolution (LTE), LTE-Advanced and the family of Worldwide Interoperability for Microwave Access (WiMax) technologies. MIMO or Multiple Antenna Techniques can encompass a variety of operating modes which include spatial multiplexing, transmit diversity and beamforming, but when talking about MIMO, it is more commonly associated with spatial multiplexing. To achieve a MIMO configuration, at least 2 antennas are required at each end of a communications link; as such this is referred to as a 2×2 MIMO configuration. Many cellular mobile base station antenna systems may employ cross polarised (X-polar) antenna arrays using X-polar antenna elements arranged in slant +45° and slant −45° linear polarised arrays to provide two antenna arrays within the same volume. MIMO mobile terminal devices may also employ an X-polar antenna, for volume/size efficiency. Base station antenna systems can be packaged as multi-band antennas where a number of X-polar antenna arrays are in close proximity to each other sharing the same antenna chassis and radome. Furthermore, each X-polar array in an antenna can be designed to operate over a wide range of frequencies to cater for operation in many mobile/cellular spectrum bands.

The performance or spectral efficiency of a spatial multiplexed MIMO link using X-polar antennas is dependent upon a number of factors including the Ricean K-factor of the radio channel (i.e., a measure of how "Line of Sight" (LoS) the link is), the channel quality (C/I), the Cross Polar Discrimination (XPD) of the link (i.e., a measure of de-polarisation character), and sub-channel correlation (i.e., a measure of the MIMO branch de-correlation, and power imbalance).

The XPD of the link is a measure of the isolation between MIMO branches and is generally characterized by the de-polarisation experienced in the radio channel. XPD decreases with decreasing Ricean K-factor, i.e., when there is increased multi-path opportunity in the radio channel, and in particular as Line of Sight radio paths diminish. As a result, XPD generally decreases with increasing range. When low or poor XPD conditions are experienced, then spatial multiplexed MIMO may not be possible due to insufficient MIMO branch isolation, and MIMO must rely upon de-correlation of multi-path between MIMO branches. However, under LoS or Near LoS propagation conditions, typical of when a mobile terminal is close to a base station, then good or high radio channel XPD is experienced and can be for example be typically 20 dB. This means that if an X-Polar antenna is used then each MIMO branch is reasonably well isolated and hence can support Spatial Multiplexing where each branch would be limited to a C/I of 20 dB. However, it is important to recognize that the overall link XPD is also influenced by antenna XPD characteristics. If either the base station antenna or terminal antenna has poor XPD, then the overall MIMO link XPD will become "antenna limited" rather than "radio channel limited". As such, it is advantageous that antennas have good or high XPD performance in order that Spatial Multiplexing MIMO communications can be maintained close to the base station in line of sight radio environments.

In particular, the present disclosure exploits knowledge of the antenna's native cross-polar performance (i.e., through measurements). Many base station antennas are characterised through measurements, in terms of gain and cross-polar component for a wide range of azimuths, tilts, and frequencies of operation. The present disclosure uses knowledge of such cross polar measurements of the native cross-polar performance to achieve appropriate suppression of cross-polar components.

Mobile broadband operators, base station vendors, antenna vendors, power amplifier vendors may benefit from the present disclosure insofar as embodiments of the present disclosure ensure that the XPD of a communications link is radio channel limited and not antenna limited. Because of the explosive capacity demand mobile broadband is experiencing, mobile operators and the equipment vendors which supply the operators are seeking to enhance spectral efficiency. This includes catering for wider bandwidth performance, more spectral bands (as digital dividend and white space spectrum becomes available), and higher topology density networks (to achieve tighter geographic spectrum re-use). Wider and multi-band antennas place design limits upon inherent XPD performance, and the fact that network density is increasing means that the probability of Line of Sight (LoS) radio channel conditions will be increasing, which, in turn, means that the radio channel has high XPD.

In various embodiments, the present disclosure is applied in non-MIMO applications. One such application is to mitigate adjacent channel interference, and permit tighter adjacent spectrum use between two users of adjacent spectrum. For example, in Europe the digital dividend spectrum proposed for mobile broadband is 791-862 MHz, and the digital terrestrial TV broadcasters are adjacent using spectrum from 470-790 MHz. It can be shown that transmissions from nearby mobile base stations (Downlink) which occupy spectrum down to 791 MHz can cause adjacent channel interference into nearby domestic TV receivers which are tuned to TV broadcasts which occupy spectrum up to 790 MHz. This is because the Adjacent Channel Selectivity (ACS) of domestic TV receivers can only offer typically 30 dB protection ratio between the wanted TV broadcast and the unwanted adjacent channel signal. If the TV broadcast is using one linear polarisation (e.g., Horizontal polarisation), then in one embodiment adjacent channel interference is mitigated by transmitting to the mobile base station using the orthogonal polarisation (e.g., Vertical polarisation). It is assumed that the Vertical polarized antenna has excellent XPD either because the antenna is a well engineered single polarized array or indeed uses a cross polar suppression technique as described herein. It is further assumed that the nearby TV receivers are using horizontally linearly polarized directional rooftop Yagi antennas which have Line of Sight (LoS) radio channel and hence the radio channel has very high XPD. This mitigation technique may offer additional many dB's adjacent channel protection due to, and limited by, the XPD performance of domestic rooftop Yagi type antennas, but may not offer sufficient additional margin to ensure that adjacent channel interference is fully suppressed. However, if the base station also transmits a Horizontally polarized transmission from a col-located but separate Horizontally polarized antenna array in phase reversal and at a level relative to the Vertically polarized base station Downlink transmission, then the cross-polar component of the Vertical transmission is cancelled or substantially suppressed at the domestic rooftop antennas. This application may then provide up to 30 dB of effective XPD for the mobile base station signal at the domestic antenna, and as such provide a total of 60 dB protection ratio together with the TV receiver ACS.

This application is different than the MIMO application, but includes the same feature of intentionally radiating an orthogonally polarized signal such that it vectorially cancels with the inherent cross-polarized component at the source antenna or reception antenna of the communications link.

In one embodiment, the present disclosure provides a cross polar suppression technique that can be used with a wide and diverse range of physical antenna designs, wide bandwidth, wide range of azimuth angles, and tilt angles. For example, one embodiment of the present disclosure maximizes XPD of a dual linear cross-polarised antenna via a cross-coupling network between Base Station MIMO branches prior to connection to the base station antenna. A cross coupling network is used to combine each MIMO branch signal with an attenuated phase reversed (phase shifted) copy of the other MIMO branch signal. The amount of attenuation for each branch will be equivalent to the cross polar suppression required for each antenna array. The cross-coupling can be applied at different stages of signal processing within a base station.

Figure 1:
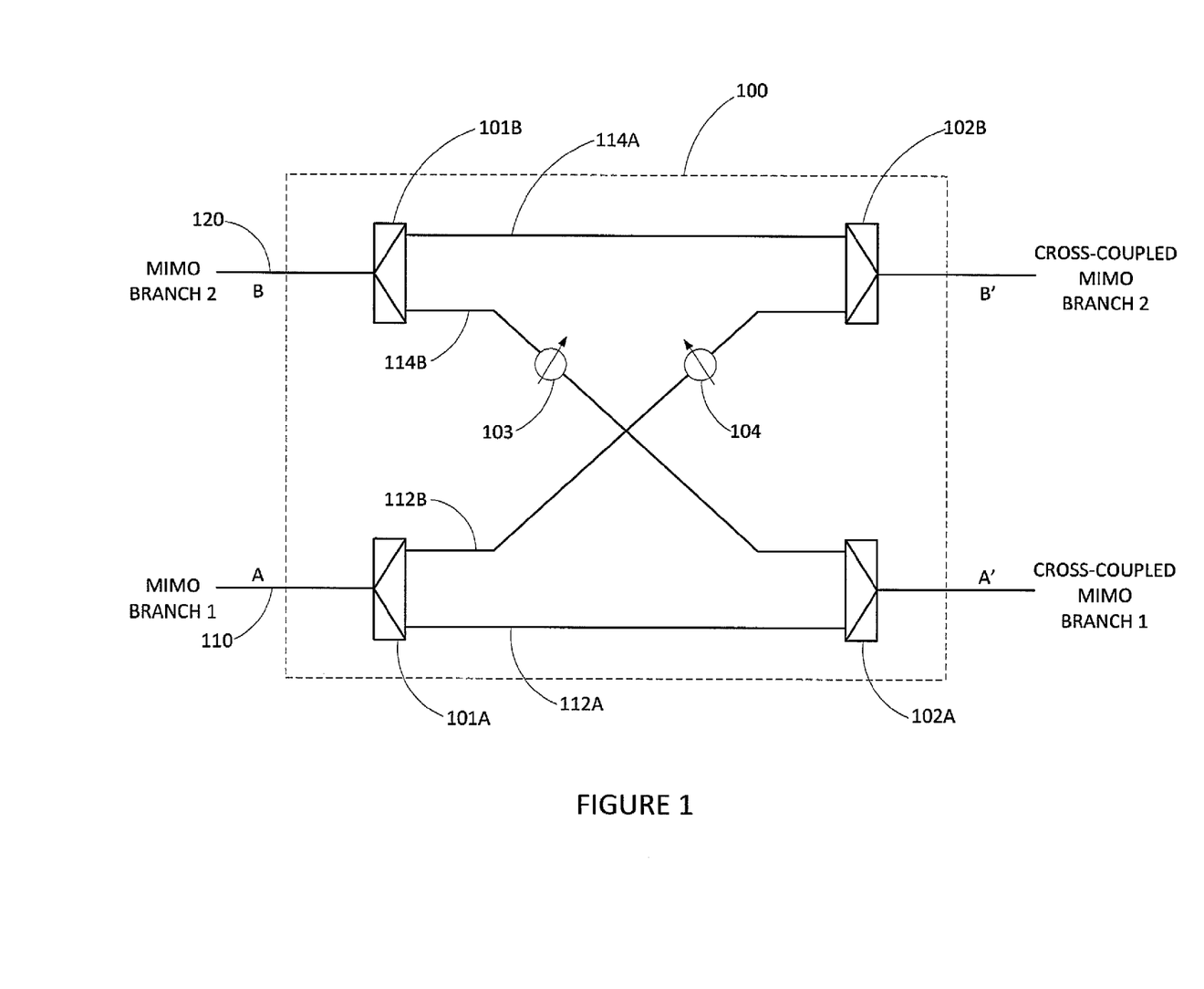
FIG. 1 shows a cross-coupling network according to one embodiment of the disclosure.

FIG. 1 depicts the functional method and structure of cross-coupling using RF splitting, combining and phase shifting components. As shown in FIG. 1, MIMO Branch 1, 110, is applied to Port A of the cross-coupling network 100. MIMO Branch 1 is split into two signal components of different power via splitter 101A. MIMO Branch 2, 120, is applied to Port B of the cross-coupling network 100, which is split into two signal components of different power via splitter 101B. The first signal component 112A of MIMO Branch 1 (an undelayed component signal) is connected to a first port of the 2-port asymmetric power signal combiner 102A. The second signal component 112B of MIMO Branch 1 is phase delayed by variable phase shifter 104 to create a sustainably phase reversed signal (a delayed component signal) with respect to first signal component of MIMO Branch 1, and is connected to one port of the 2-port asymmetric power signal combiner 102B. Similarly, the first signal component 114A (an undelayed component signal) of MIMO Branch 2 is connected to a second port of the 2-port asymmetric power signal combiner 102B. The second signal component 114B of MIMO Branch 2 is phase delayed by variable phase shifter 103 to create a sustainably phase reversed signal (an undelayed component signal) with respect to first signal component of MIMO Branch 2, and is connected to one port of the 2-port asymmetric power signal combiner 102A. The combined signal at Port A' at the output of the 2-port combiner 102A is composed of MIMO Branch 1 and an attenuated phase reversed copy of MIMO Branch 2. The combined signal at Port B' at the output of the 2-port combiner 102B is composed of MIMO Branch 2 and an attenuated phase reversed copy of MIMO Branch 1.

In one embodiment, the splitters (101A 101B) and combiners (102A, 102B) have variable power splitting, and combining, respectively, to permit tuning and optimization of the cross-coupling network. In one embodiment, the phase shifters are a fixed length of line to create a static phase shift. In another embodiment, the phase shifters are variable phase shifters to permit tuning and optimization of the cross-coupling network. X-Polar antennas may have a varying inherent XPD character with azimuth angle, tilt and frequency of operation. Thus, it is preferred to have such variable phase and power parameters in order to maximize XPD over the desired azimuth, tilt and frequency ranges. In one embodiment, the attenuation and phase shifting is continuously variable or includes adaptable parameters which can be adjusted based upon how the XPD character of the X-Polar antenna varies with different frequencies and tilts (base station antennas) across the bandwidth of operation of the antenna. As such, the MIMO link is radio-channel XPD limited and not antenna XPD limited thus relieving some antenna design constraints, and ensuring the MIMO link is maximized for spectral efficiency.

Figure 2:
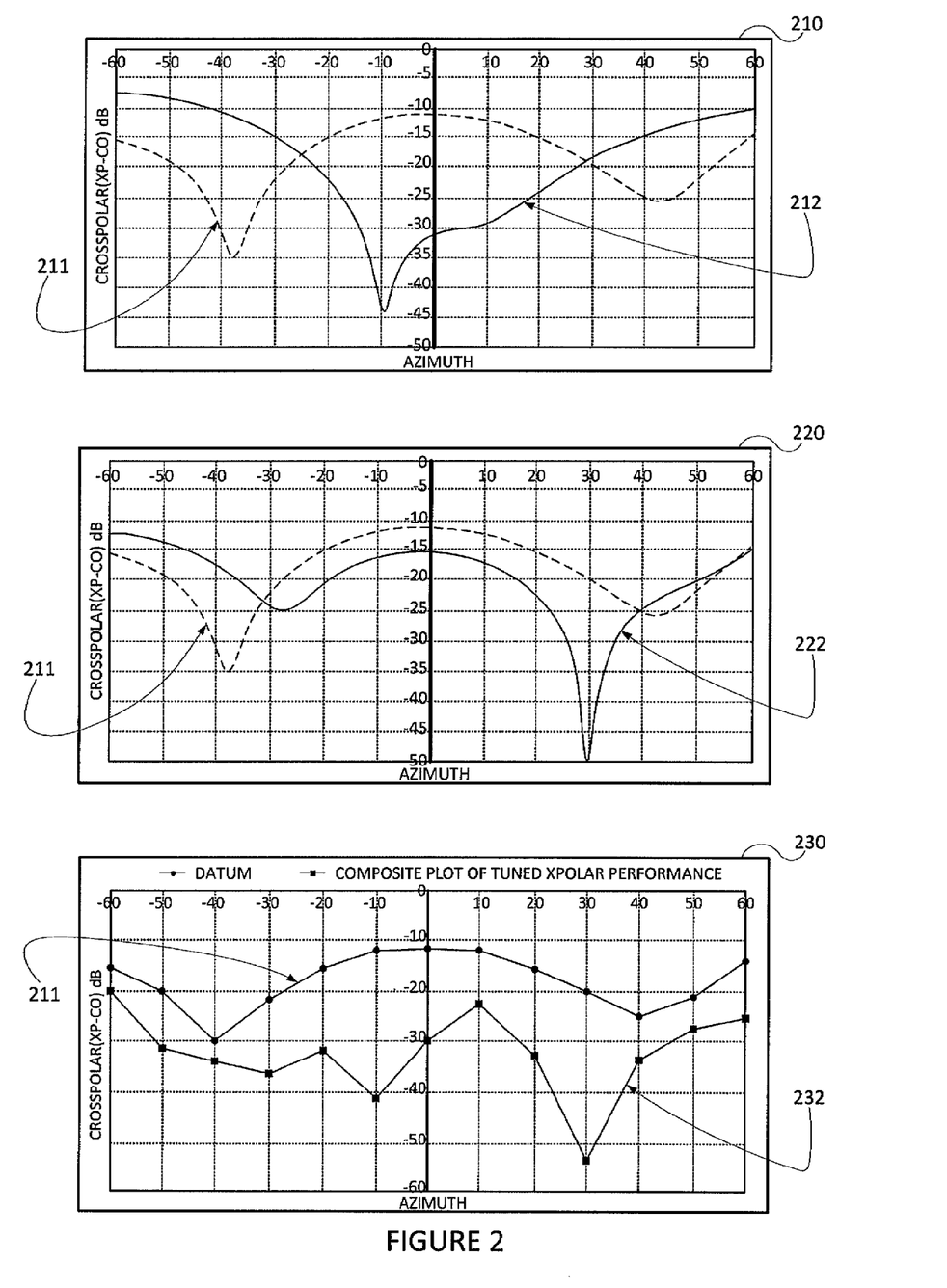
FIG. 2 shows a summary of Antenna XPD with and without proposed Cross-Coupling according to the present disclosure.

FIG. 2 illustrates achievable antenna XPD performance enhancements using embodiments of the present disclosure (e.g., using a cross-coupling network as shown in FIG. 1). As shown in FIG. 2, the top graph 210 depicts the XPD as a function of azimuth angle between −60 degrees and +60 degrees (dotted line 211). Note the rather poor XPD performance at/around boresight azimuth angle where XPD is less than 20 dB between −30 degrees and +30 degrees. The solid curve 212 depicts the XPD performance of the antenna after implementing embodiments of the present disclosure, where the cross-coupling network has been tuned to provide optimal XPD performance around boresight.

The centre plot 220 of FIG. 2 illustrates the same XPD performance but now with the cross-coupling network (e.g., the cross-coupling network of FIG. 1) optimised for maximum XPD performance at +30 degrees Azimuth angle (solid curve 222).

The bottom plot 230 of FIG. 2 illustrates the composite XPD performance 232 across all Azimuth angles after optimised cross-coupling (e.g., using the cross-coupling network of FIG. 1) is applied in 10 degree intervals. This bottom plot illustrates that >20 dB XPD can be achieved for all Azimuth angles. Note that relatively coarse cross-coupling tuning has been applied in arriving at the results in FIG. 2, using 1 dB attenuation steps within the Cross-Coupling device (e.g., the cross-coupling network of FIG. 1). It can be shown that with 1 dB amplitude resolution step tuning in the Cross-Coupling function, it will allow at a minimum a 10 dB improvement of antenna XPD performance, based on quantitation error analysis. Finer resolution of amplitude adjustment is likely to reveal even stronger XPD enhancement. FIG. 2 illustrates how XPD as a function of Azimuth angle can be optimised. A similar approach applies (but not illustrated for clarity) for optimised XPD over different tilt angles and for different frequencies within the bandwidth of the antenna. In one embodiment, the present disclosure generates a signal which is "pre-distorted" by an inverse of the anticipated inherent Cross Polar component of the antenna, prior to actual radiation by the antenna.

In accordance with embodiments of the present disclosure, conventional antenna element and array construction techniques can be applied, especially for wideband and/or multi-array platforms which can result in modest native antenna XPD performance. Embodiments of the present disclosure allow even a modest or poor XPD performing antenna array to have good/excellent antenna XPD performance, and provide a means to optimise XPD performance for different beam tilt angles and frequency ranges. Moreover, the embodiments of the present disclosure described below can be applied external (non-invasive) to any existing X-Polar antenna (with modest XPD performance) in order to enhance antenna XPD performance.

In addition, embodiments of the present disclosure applied at low power RF, or baseband, achieve enhanced antenna XPD performance; thus allowing lossless solutions to be achieved. Furthermore, embodiments of the present invention applied at baseband to independent information channels achieve consistent strong antenna XPD performance over all azimuth angles.

In various embodiments, the cross-coupling network (e.g., the cross-coupling network of FIG. 1) can be applied at high-power RF, low-power RF (i.e., prior to power amplification), at any IF stages, at baseband (i.e., prior to RF up-conversion and amplification), or at individual baseband independent channel level (i.e., prior to multiplexing of multiple information channels into a composite baseband signal), as described in the various embodiments below. Depending upon where the cross-coupling network is applied, it will offer different benefits. The following describes the benefits of each application with reference to a base station embodiment.

Embodiment 1

Cross-Coupling Applied Between Base Station and Antenna

Figure 3:
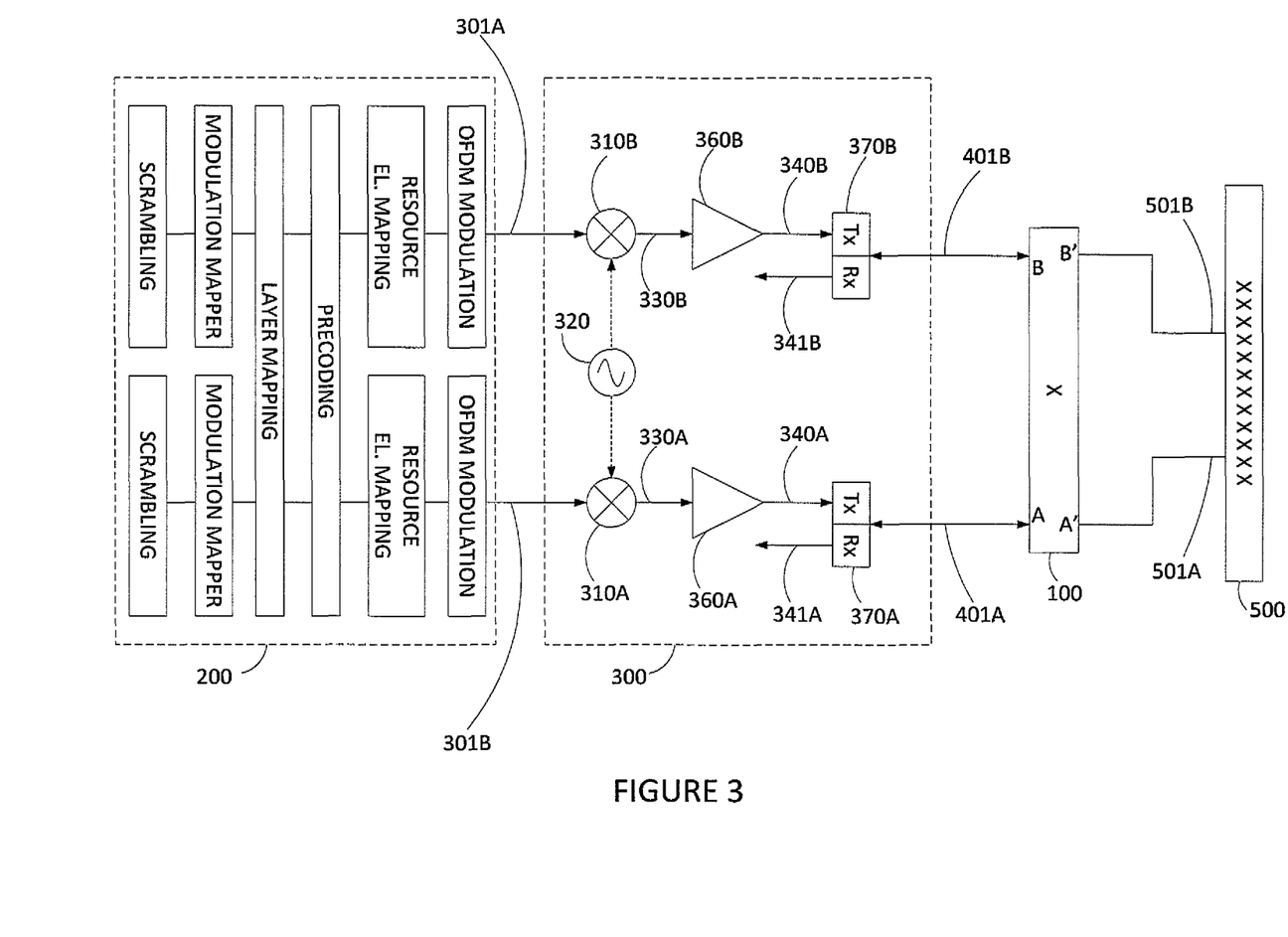
FIG. 3 depicts one embodiment having a Cross-Coupling Network applied after Power Amplification and before connection to dual-Polar X-Polar Antenna.

FIG. 3 illustrates a cellular radio base station comprising baseband processing section (200) and RF processing section (300) has two antenna RE ports (401A, 401B). FIG. 3 also illustrates an antenna array 500 having antenna connection ports (501A, 501B) of an X-Polar antenna array. In one embodiment, as shown schematically in FIG. 3, a cross-coupling function or module (100) as shown above in FIG. 1, is applied in a base station configuration after the base station modules (e.g., baseband processing section of the base station 200, and RF processing section of the base station 300) and before connection to the X-Polar antenna (500), whereupon a cross-coupling network is tuned/designed to maximize XPD over the intended or most important range of azimuth angles, electrical tilts and frequencies. It should be noted that the base station modules or sections (collectively to be referred to as a base station) are only provided as an illustration and should not be interpreted as a limitation of the present disclosure. Base stations of other configurations or with different functions are within the scope of the present disclosure. In other words, the various components or functions of the base station are simply provided to give context as to the relative location or deployment of the cross-coupling network of FIG. 1, as described in various embodiments that are discussed in this disclosure.

Returning to FIG. 3, given that the power splits in the cross-coupling network (100) at splitters 101A and 101B will be generally highly asymmetric, then the resulting absolute power levels in the component signals which contain the phase shifters may be small. Thus, the phase shifting components, in one embodiment, may be solid state devices rather than mechanical phase shifting devices. When the cross-coupling network is applied as per this embodiment (e.g., at high power RF) then passive RF splitting and combining devices will be needed, which may introduce some small passive losses. However, the benefit of this embodiment means that the solution can be applied externally between the existing base station equipment and antenna, and thus can be applied externally to the base station.

Embodiment 2

Cross-Coupling applied between Power Amplifiers and Duplexing

Figure 4:
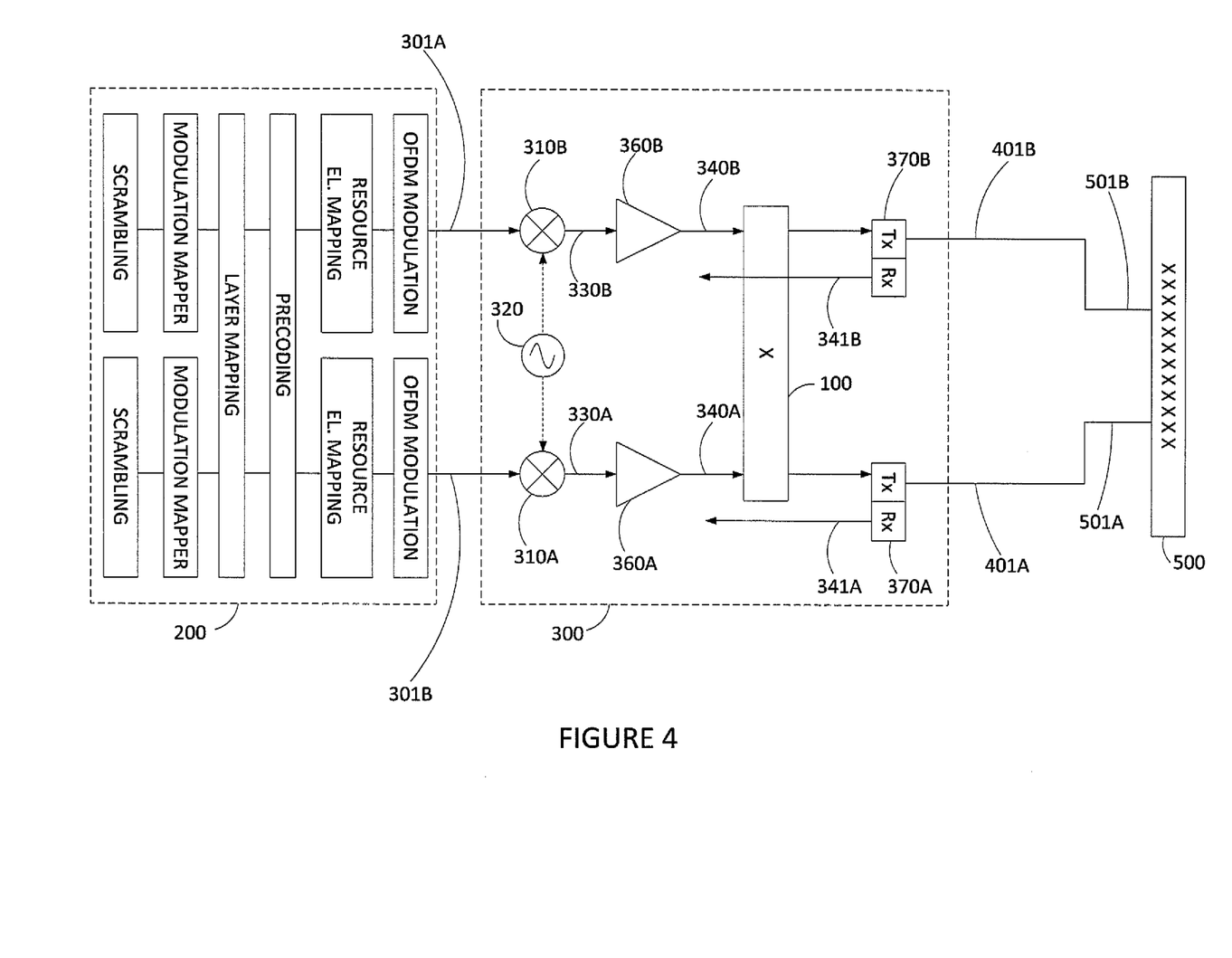
FIG. 4 depicts one embodiment having a Cross-Coupling. Network applied after Power Amplification and before Duplexing stages.

In another embodiment, as shown schematically in FIG. 4, the cross-coupling network (100) as shown above in FIG. 1, is applied after the power amplifiers (360A, 360B) but before any Tx/Rx duplexing stages (370A, 370B) within the base station RF section (300). In this embodiment, independent Tx and Rx path cross-coupling networks can be implemented. Transmit and receive RF channels in Frequency Division Duplex (FDD) base station systems are commonly Tx/Rx duplexed (370A, 370B) within the base station RF Section (300), where Tx and Rx channels could be significantly separated in frequency, and would lead to different antenna XPD characteristics for Tx and Rx frequencies. This embodiment permits independent cross-coupling networks and tuning for Tx and Rx paths. For clarity, FIG. 4 only shows the cross-coupling network applied in the Tx path. However, a similar arrangement will exist for the Rx path, or alternatively only have a Tx or Rx cross-coupling network.

Embodiment 3

Figure 5:
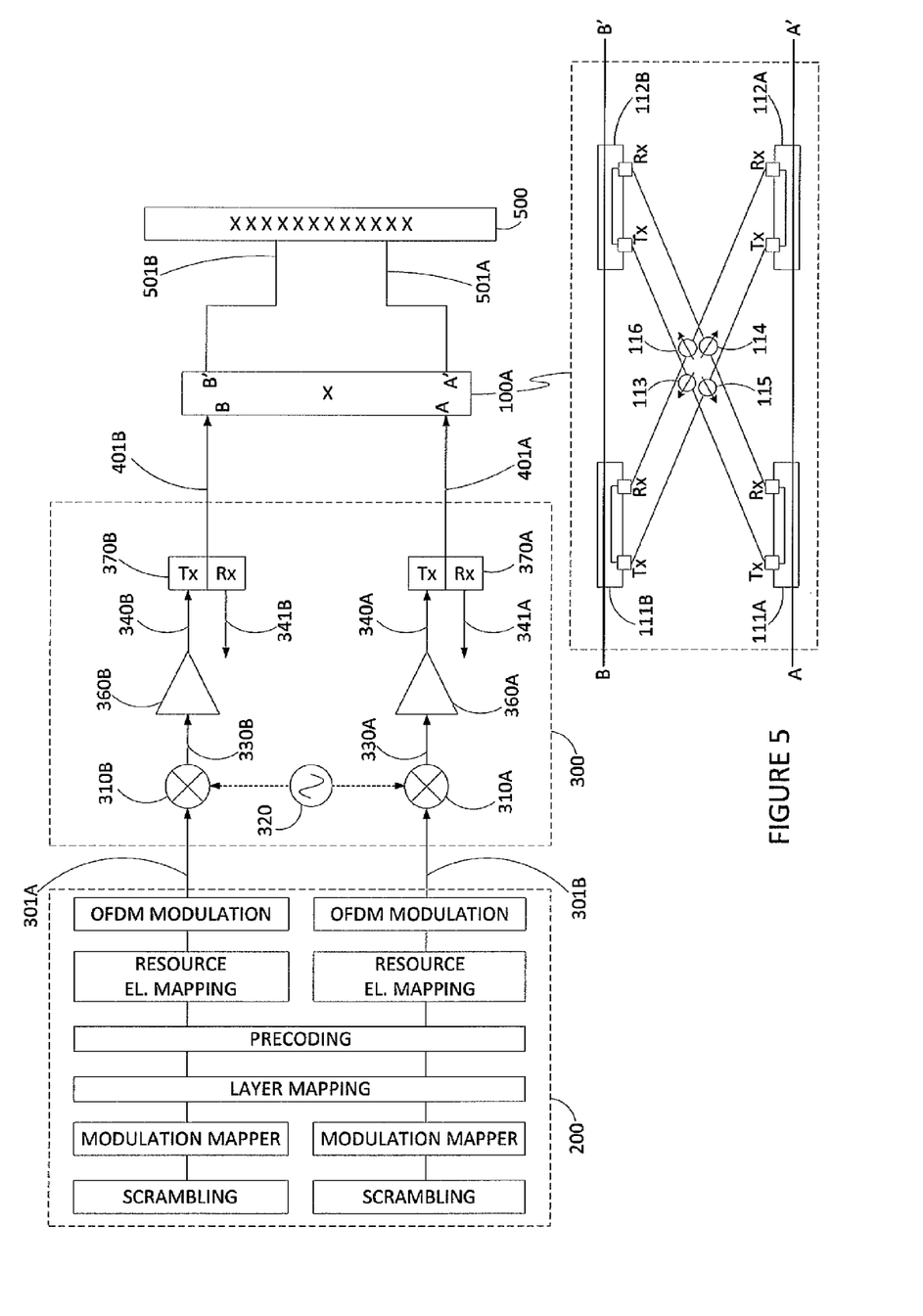
FIG. 5 depicts one embodiment having a Cross-Coupling Network applied after Power Amplification and before connection to dual-Polar X-Polar Antenna using Directional Couplers.

Cross-Coupling Applied Between Base Station and Antenna Using Directional Coupling Devices Yet another embodiment, as shown schematically in FIG. 5, uses a cross-coupling network (100A) having directional power coupling devices (111A,112A,111B,112B) to perform the power splitting and re-combining functions of the cross-coupling network. This cross-coupling network (100A) is an alternate embodiment of the cross-coupling network (100) of FIG. 1. Transmit and receive RF channels in Frequency Division Duplex (FDD) base station systems are commonly Tx/Rx duplexed within the base station, where Tx and Rx channels could be significantly separated in frequency, and would lead to different antenna XPD characteristics for Tx and Rx frequencies. This embodiment permits independent cross-coupling networks and tuning for Tx and Rx paths. In other words, two cross-coupling networks can be applied, where both cross-coupling networks share the same splitting and combining components which are directional RF couplers to permit separate and independent cross-coupling for Base Station Downlink (Transmit) and Uplink (Receive) channels.

Embodiment 4

Cross-Coupling Applied Between Low Power RF and Power Amplification

Figure 6:
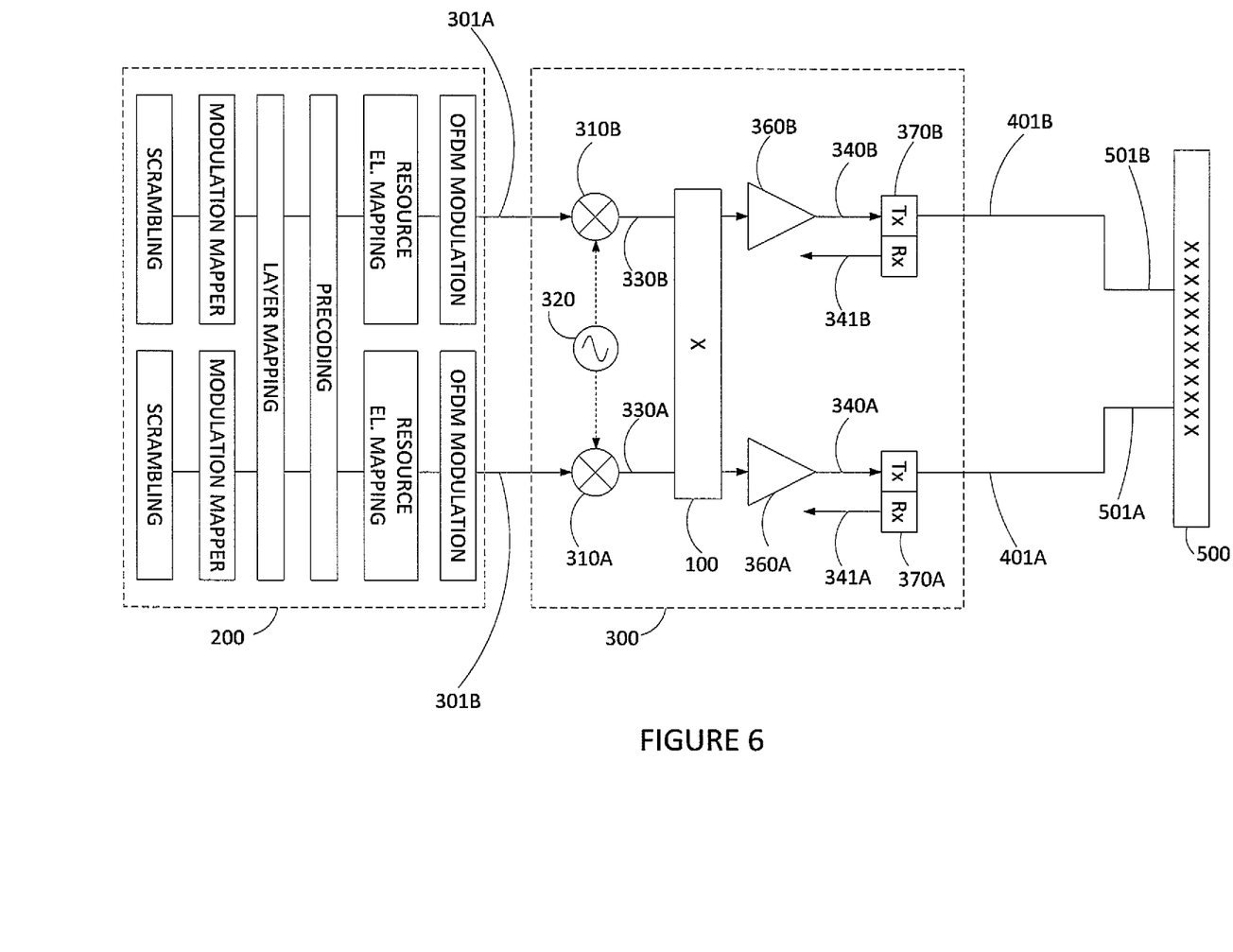
FIG. 6 depicts one embodiment having a Cross-Coupling Network applied at Low-Power RF stages within Base Station RF section.

In still another embodiment, as shown schematically in FIG. 6, the cross-coupling network (100) as shown above in FIG. 1, is applied before the power amplifier stages (360A, 360B), within a base station RF section (300). This reduces RF power coupling between antenna ports over the previous embodiments, and allows complete solid state variable power splitting/combining and phase shifting functions within the cross-coupling network (100). In one embodiment, when the cross-coupling network is applied at low power RF (e.g., prior to power amplification), smaller RF coupling devices and phase shifters are used, with the added benefit that electronic phase shifting (as opposed to mechanical coupling) can be exploited. This application requires that a cross-coupling network is applied at the pre-amplification stages of the base station power amplifier.

Embodiment 5

Cross-Coupling Applied Between Baseband and RF Up-Conversion

Figure 7:
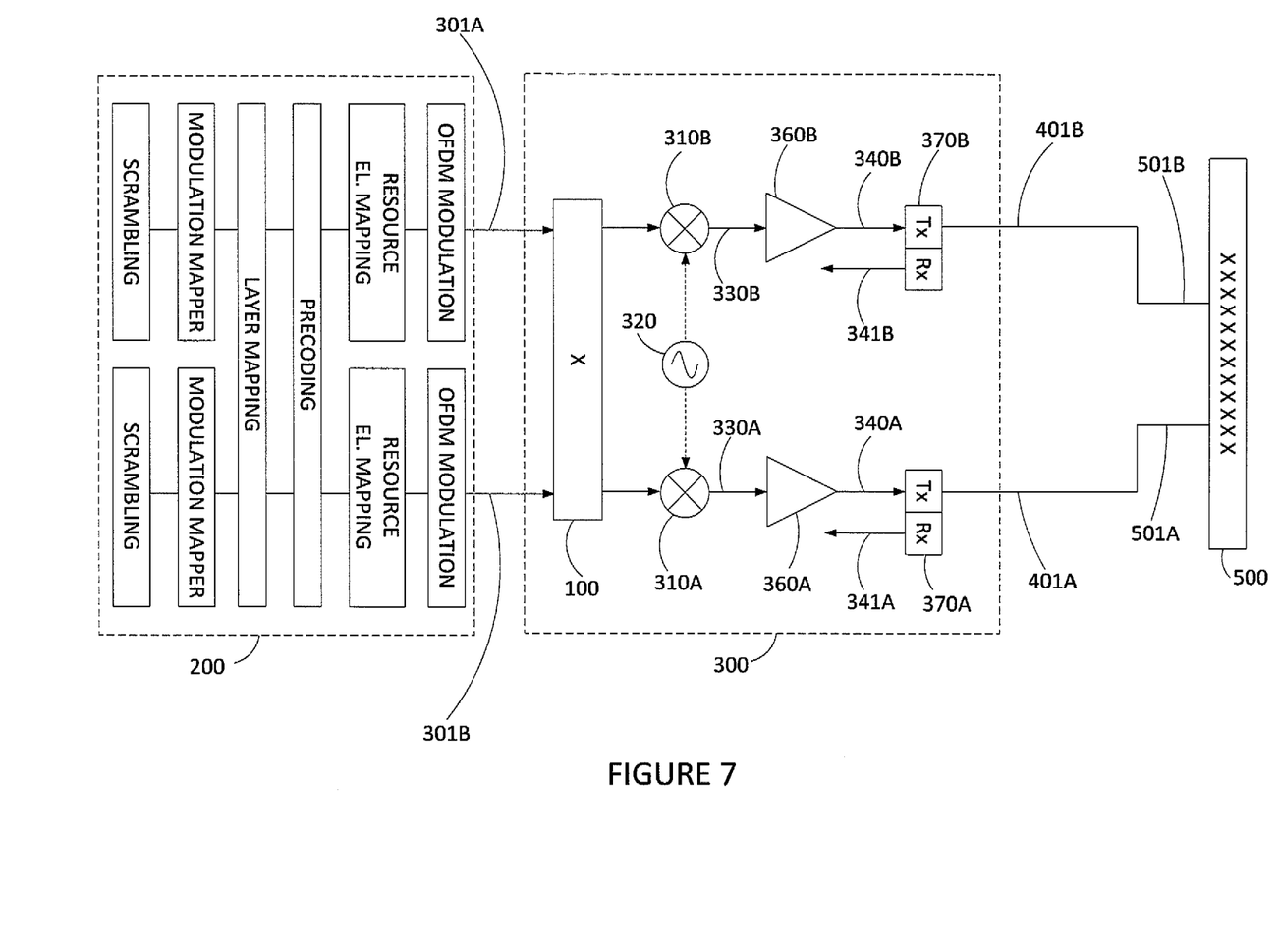
FIG. 7 illustrates one embodiment having a Cross-Coupling Network applied at Baseband between Baseband Processing and RF processing sections of a Base Station System.

A further embodiment, as shown schematically in FIG. 7, applies the cross-coupling network (100) as shown above in FIG. 1, at the output of a baseband section (200) of a base station system, and before the RF Section (300). This permits a totally digital implementation to be achieved as algorithmic processing in, for example digital signal processing hardware. Thus, in one embodiment, the cross-coupling network (100) is implemented in DSP hardware.

As shown in the example of FIG. 7, the cross-coupling function (100) performs cross-coupling as depicted schematically in FIG. 1. Note, however, that at baseband, physical splitting and phase shifting devices/components would not be actually used. When the cross-coupling network is applied at baseband, in one embodiment, phase reversal and attenuation is applied as part of the baseband digital signal processing as a simple weighted subtraction per MIMO branch. This means that no additional components are necessary, just additional digital signal processing steps.

All of the above embodiments aim to create a similar outcome; each radiated MIMO signal from each orthogonal polarisation of the X-Polar antenna then comprises of: (1) the wanted MIMO branch signal at the desired linear polarisation plus (2) a cross-polar component which has relative power of −XPD dB plus (3) a phase reversed cross-polar component which has relative power of −XPD dB; where XPD is the cross-polar discrimination performance of the array at that frequency, azimuth angle, and tilt angle. The latter two radiated components will phase cancel, and as such the antenna exhibits near perfect Co-Polar performance in the far field.

Embodiment 6

Cross-Coupling Applied within Baseband Processing on Individual Channels

Figure 8:
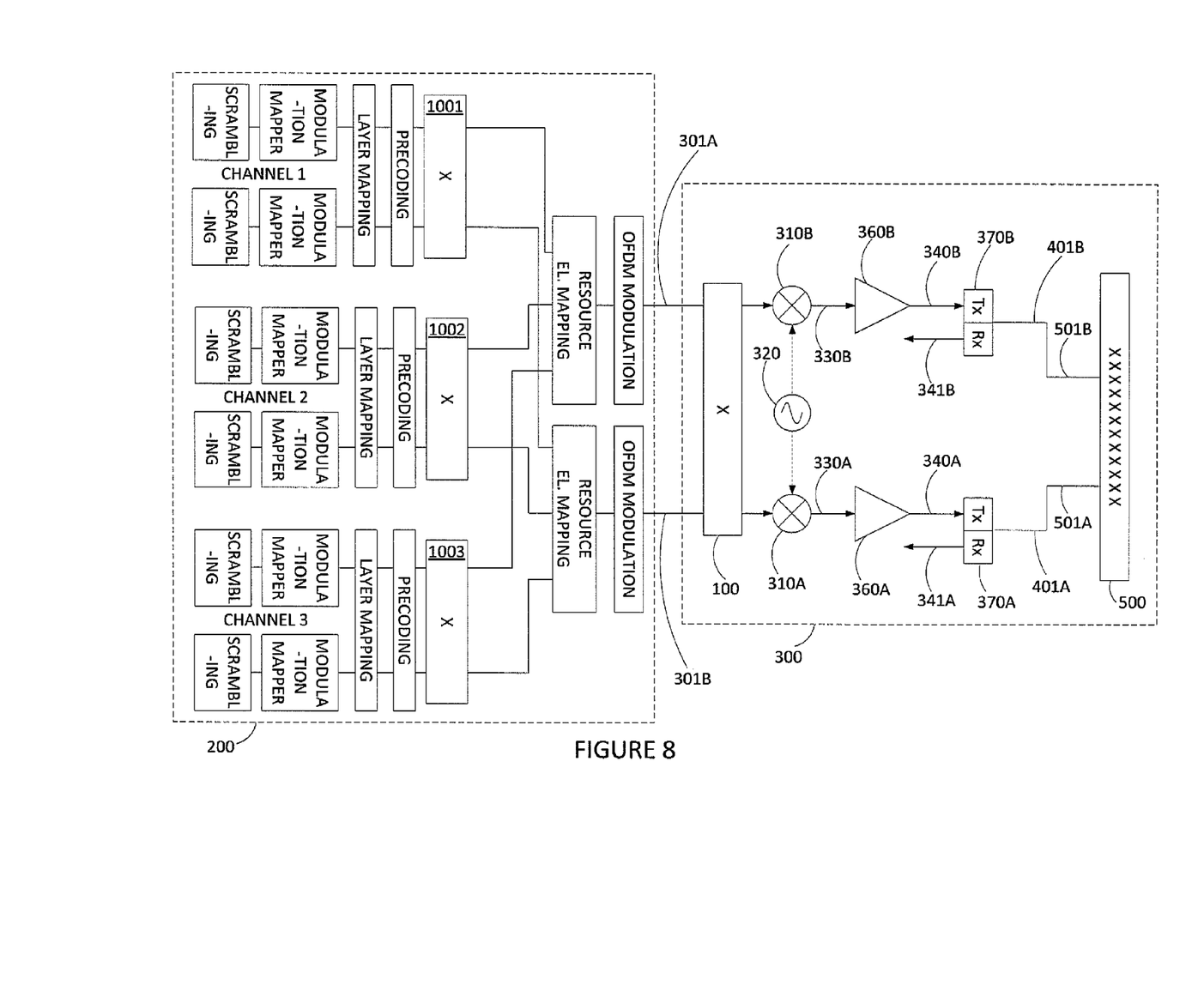
FIG. 8 illustrates one embodiment having a Cross-Coupling Network applied within Baseband on Individual Channels within a Base Station System.

Still another embodiment, as shown schematically in FIG. 8, applies cross-coupling (shown separately as 1001, 1002, and 1003) within the baseband processing section (200) of a base station system, and is applied on multiple individual information channels. In LTE or LTE-Advanced, for example, different information channels associated with different subscribers, or different common cell channels, are mapped to different Physical Resource Blocks (PRBs). In all the above FIGS. 3-7, by way of example, the baseband processing stage (200) is shown for LTE downlink processing only for clarity. LTE Physical Resource Blocks are allocations of Orthogonal Frequency Divisional Multiplex (OFDM) sub-tones in frequency and time. The downlink baseband processing section (200) of a base station system for LTE consists of multiple processing stages including; scrambling, modulation mapping, layer mapping, pre-coding, resource element mapping and OFDM modulation. This embodiment permits XPD suppression at a per PRB resolution and hence independent communication signal, channel, or per mobile user, resolution, given that different users will use different PRBs at different times and such users can be at different azimuthal angles, beam tilt angles and (OFDM) frequencies within the collective downlink bandwidth of the communication system. In such embodiment, the cross-coupling can be applied at different processing stages within the baseband processing section (200), but in one embodiment, is most appropriately implemented as part of the pre-coding process, as illustrated in FIG. 8.

Specifically, FIG. 8 depicts an expanded illustration of an LTE Base Station baseband processing function (200), to show multiple information channels (can be numerous channels, three channels shown, for clarity only) associated with different data (e.g., user data). Each channel is processed independently up until the Resource Element Mapping stage within an LTE implementation. The Resource Element Mapping stage assigns different PRBs to different information channels in LTE. In the embodiment depicted in FIG. 8, the cross-coupling function has three different processing stages (1001, 1002, 1003) following the respective pre-coding stages.

The cross-coupling function or network for each channel (1001, 1002, 1003) performs cross-coupling as depicted schematically in FIG. 1, although at baseband, physical splitting and phase shifting devices/components would not be actually used. When the cross-coupling network is applied at a baseband logical channel level (e.g., user level resolution), then in one embodiment phase reversal and attenuation is applied as part of the baseband digital signal processing as simple weighted subtractions per MIMO branch, per user specific channel. The added advantage in this application is that the cross polarization can be suppressed on a per mobile user basis. Antenna XPD will vary as a function of azimuth angle, normally a maximum at boresight. If information as to the azimuthal angle to mobile users served by the antenna is known, and the XPD of the antenna as a function of azimuth is known, then in one embodiment the cross-coupling network is used to suppress cross polarization consistently across the base station cell served by the antenna.

Embodiment 7

Cross-Coupling Applied to Mitigate Inter-System Interference

In further embodiments, the present disclosure is used to enhance co-existence of wireless systems, to reduce inter-system interference where each wireless system is using orthogonal polarizations, using the same or proximate radio spectrum and physically closely spaced to each other.

Figure 9:
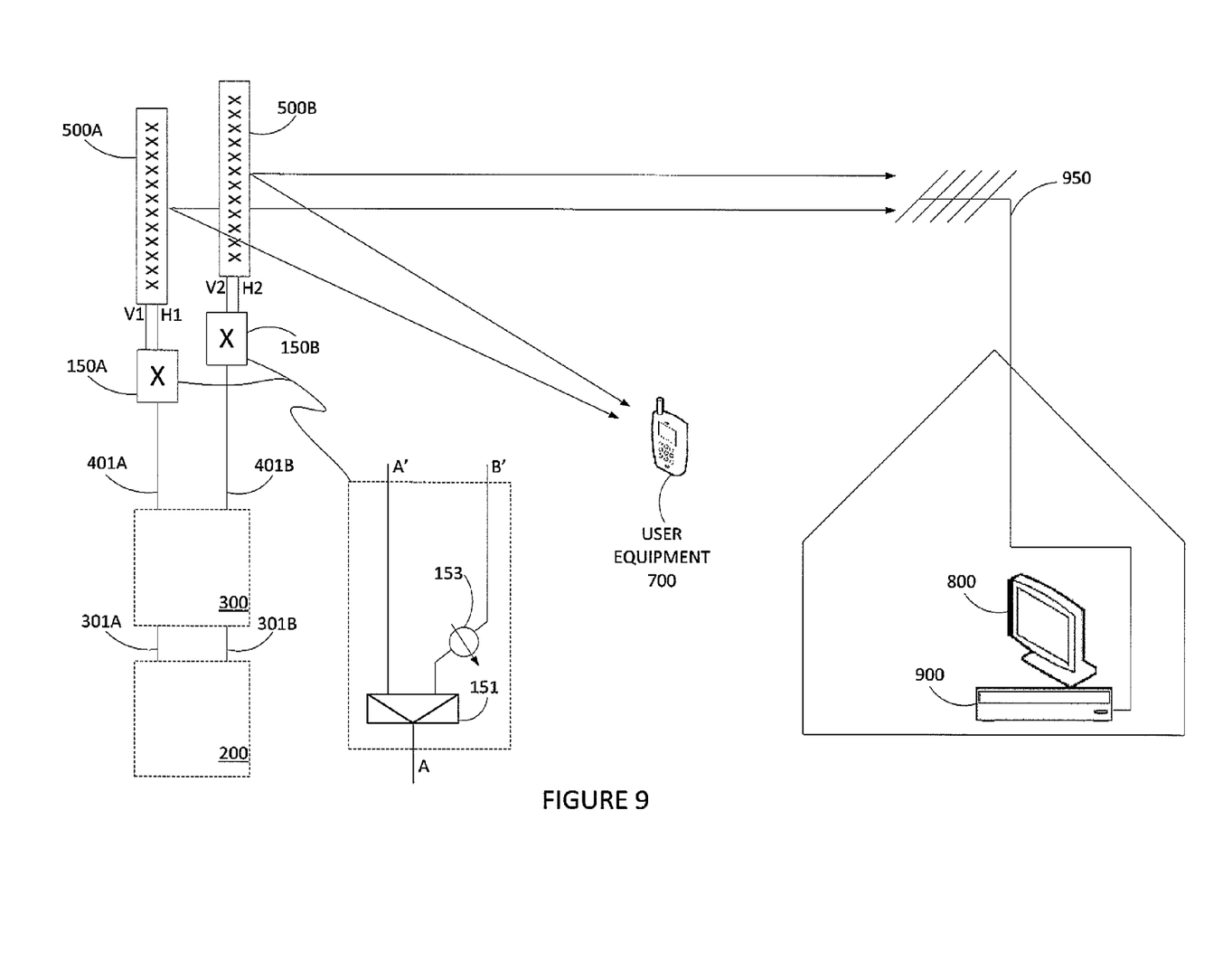
FIG. 9 illustrates one embodiment having a Cross-Coupling Network applied at Cellular Base Station System to permit enhanced co-existence of wireless systems using orthogonal polarizations.

For example, as depicted schematically in FIG. 9, a cellular radio base station comprising baseband processing section (200) and RF processing section (300) has two antenna RF ports (401A, 401B) which connect to two dual-polarised antennas (500A, 500B) each with Vertical (V) and Horizontal (H) polarised arrays via cross-coupling devices (150A, 150B). The two base station ports (401A, 401B) may for example be associated with an LTE base station delivering two MIMO branches.

Considering one of the cross-coupling devices (150A), this takes RF input signal from base station port (401A) and splits this into two component signals via splitter (151) of different amplitude and applies a phase reversal via phase shifter (153) to one component signal. The splitter (151) and phase shifter (153) may be continuously variable devices to permit variable power splitting and phase shifting, respectively for tuning of the cross-coupling device (150A). The two resulting component signals (A', B') from the cross-coupling device are then applied to the $V_n$ and $H_n$ ports of Antenna 500A. The intention is to deliver the majority of the RF power into the Vertically Polarised array in Antenna 500A and a small phase-reversed component signal into the Horizontally Polarised array in Antenna 500A.

The same arrangement is applied to the second antenna (500B). Thus, the base station system of FIG. 9 is configured to deliver cellular communications via two spatially separated vertically polarised antenna arrays (e.g., to permit Spatial Multiplexing MIMO and Diversity operation) to cellular mobile terminals. One such cellular mobile terminal is shown in FIG. 9 as user Equipment (700), e.g., a cellular phone, a smart phone and the like.

In one embodiment, the cellular system occupies and transmits on radio spectrum in the 791-801 MHz range. In addition, a Digital Television Broadcast system co-exists using adjacent spectrum up to 790 MHz. The digital television service is received via a domestic rooftop Yagi antenna (950) which in turn is connected to a digital television receiver (900) and a television monitor (800). The digital television service operates using Horizontal Polarisation. The Yagi antenna (950) will have a characteristic XPD performance (typically 15 dB).

Without the cross-coupling devices, the Yagi antenna would receive the wanted Horizontally Polarised Digital TV service and an unwanted Vertically Polarised Cellular base station signal; the latter signal being converted to RF power at the TV receiver (900) due to finite antenna XPD of the Yagi (950). In the case where the digital TV broadcast transmitter is very distant and/or the cellular base station is close to the Yagi antenna, there may not be sufficient V/H XPD and adjacent channel isolation to protect the TV service reception.

Thus, in one embodiment, application of the cross-coupling arrangement at the base station antennas intentionally radiates small Horizontally Polarised phase reversed versions of the two Vertically polarised base station signals at a level which when received at the Yagi antenna would vectorially cancel with the two Vertically Polarised signals from the cellular base station at the Yagi. If the Yagi antenna has an XPD of 15 dB, then the intentionally radiated Horizontally phase-reversed polarised signal should be 15 dB lower than the Vertically Polarised cellular base station signals.

This embodiment relies upon all Yagi Antennas in the co-existence area to have the same or very similar XPD characteristic.

A non-exhaustive list of various embodiments of the present disclosure is as follows:

One embodiment provides a wireless base station system with two MIMO RF ports arranged for operation with a dual-orthogonally polarised cross-polar antenna array. The antenna array consists of a plurality of antenna radiating elements. A cross-coupling network is configured to vectorially combine power from each base station port to the other base station port, with power and phase adjustment control.

In one embodiment, the cross-coupling network is arranged to have 2 input ports and 2 output ports, where a first input signal is split into two component signals of variable power difference, and one component signal receiving a variable phase delay. A second input signal is split into two component signals of variable power difference, and one component signal receiving a variable phase delay.

In one embodiment, the un-delayed component signal associated with the first input signal is combined with the delayed component signal associated with the second input signal. The un-delayed component signal associated with the second input signal is combined with the delayed component signal associated with the first input signal.

In one embodiment, the cross-coupling network is applied after the base station RF ports, and before the cross-polar antenna connection ports.

In one embodiment, the Cross-Coupling network is applied after the base station power amplifiers, and before the base station Transmit/Receive duplex filters in the base station downlink (Transmit) channel In one embodiment, the cross-coupling network is applied after the Transmit/Receive duplex filters and before the base station receive (front-end) amplifiers in the base station Uplink (Receive) channel.

In one embodiment, two cross-coupling networks are applied. Both cross-coupling networks share the same splitting and combining components which are directional RF couplers to permit separate and independent cross-coupling for base station Downlink (Transmit) and Uplink (Receive) channels.

In one embodiment, the cross-coupling network is applied in the base station RF processing chain prior to base station power amplification stages for base station transmit (Downlink) channel signals.

In one embodiment, the cross-coupling network is applied in the base station RF processing chain after (front-end) amplification stages for base station receive (Uplink) channel signals.

In one embodiment, the cross-coupling network is applied on composite baseband signals prior to the frequency up-conversion stages for the base station downlink (Transmit) channel signals.

In one embodiment, the cross-coupling network is applied on composite baseband signals after frequency down-conversion stages for the base station receive (Uplink) channel signals.

In one embodiment, the cross-coupling network is applied on individual data channels within the digital baseband of the base station, prior to baseband signal combining and frequency upconversion stages for the base station downlink (Transmit) channel signals.

In one embodiment, the cross-coupling network is applied on individual data channels within the digital baseband of the base station, after frequency down-conversion stages and de-multiplexing of composite baseband signals for the base station uplink (Receive) channel signals.

In another embodiment, a wireless Base Station system includes two or more MIMO RF ports arranged for operation with two or more dual orthogonally polarised spatially separated (diversity) linearly polarised antennas.

In one embodiment, a first three-port cross-coupling network is applied between the first base station output and a first antenna. A second three-port cross-coupling network is applied between the second base station output and a second antenna.

In one embodiment, each cross-coupling network is arranged to have 1 input port and 2 output ports, where an input signal is split into two component signals of variable power difference, and one component signal receiving a variable phase delay. In one embodiment, the 2 output ports of each cross-coupling network being connected to the 2 orthogonal polarizations of each dual-polarised antenna.

Another embodiment provides a method of controlling and varying cross-coupling of power and phase between two orthogonally polarised antenna ports, in order to alter the cross-polar discrimination characteristics of the antenna.

In one embodiment, the method varies and controls the cross-coupling to maximize antenna cross-polar discrimination, in response to known operational parameters of the communications link, such as frequency, antenna electrical tilt angle, and azimuth angle of the communications link.

In another embodiment, a method controls and varies power and phase across two orthogonally polarised antenna arrays from a single input source, in order to alter the cross-polar discrimination characteristics of the antenna.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system, comprising:
a base station with two Multiple In-Multiple Out (MIMO) RF ports; and
a cross-coupling network configured to vectorially combine power from each of the MIMO RF port to the other MIMO RF port, wherein the cross-coupling network comprises two input ports and two output ports, where a first input signal on one of the two input ports is split into two component signals having a variable power difference between the two component signals, wherein one of the two component signals receiving a variable phase delay to generate a first delayed component signal, where a second input signal on one of the two input ports is split into two component signals having a variable power difference between the two component signals, wherein one of the two component signals receiving a variable phase delay to generate a second delayed component signal, wherein an un-delayed component signal associated with the first input signal is combined with the second delayed component signal associated with the second input signal, wherein the un-delayed component signal associated with the second input signal is combined with the first delayed component signal associated with the first input signal.

2. The system of claim 1, further comprising:
an antenna array comprising a plurality of antenna radiating elements, wherein the antenna array is communicatively coupled to the base station.

3. The system of claim 1, where the cross-coupling network is deployed after the MIMO RE ports, and before antenna connection ports of an antenna array.

4. The system of claim 1, where the cross-coupling network is deployed after power amplifiers of the base station, and before transmit/receive duplex filters in a downlink channel of the base station.

5. The system of claim 1, where the cross-coupling network is deployed after Transmit/Receive duplex filters of the base station and before receive amplifiers in an uplink channel of the base station.

6. The system of claim 1, where the cross-coupling network comprises directional power coupling devices.

7. The system of claim 1, where the cross-coupling network is deployed in a RF processing section prior to power amplification stages for Downlink channel signals of the base station.

8. The system of claim 1, where the cross-coupling network is deployed in a RF processing section after amplification stages for Uplink channel signals of the base station.

9. The system of claim 1, where the cross-coupling network is applied to composite baseband signals prior to frequency upconversion stages for the downlink channel signals of the base station.

10. The system of claim 1, where the cross-coupling network is applied to composite baseband signals after frequency downconversion stages for the Uplink channel signals of the base station.

11. The system of claim 1, where the cross-coupling network is applied on individual data channels within a digital baseband of the base station, prior to baseband signal combining and frequency upconversion stages for transmit channel signals of the base station.

12. The system of claim 1, where the cross-coupling network is applied on individual data channels within a digital baseband of the base station, after frequency downconversion stages and de-multiplexing of composite baseband signals for uplink channel signals of the base station.

13. A method, comprising:
providing, by a base station, two Multiple In-Multiple Out (MIMO) RF ports; and
vectorially combining, by a cross-coupling network, power from each of the MIMO RF port to the other MIMO RF port, wherein the cross-coupling network comprises two input ports and two output ports, where a first input signal on one of the two input ports is split into two component signals having a variable power difference between the two component signals, wherein one of the two component signals receiving a variable phase delay to generate a first delayed component signal, where a second input signal on one of the two input ports is split into two component signals having a variable power difference between the two component signals, wherein one of the two component signals receiving a variable phase delay to generate a second delayed component signal, wherein an un-delayed component signal associated with the first input signal is combined with the second delayed component signal associated with the second input signal, wherein the un-delayed component signal associated with the second input signal is combined with the first delayed component signal associated with the first input signal.

14. The method of claim 13, further comprising:
an antenna array comprising a plurality of antenna radiating elements, wherein the antenna array is communicatively coupled to the base station.

15. The method of claim 13, where the cross-coupling network is deployed after the MIMO RF ports, and before antenna connection ports of an antenna array.

16. The method of claim 13, where the cross-coupling network is deployed after power amplifiers of the base station, and before transmit/receive duplex filters in a downlink channel of the base station.

17. The method of claim 13, where the cross-coupling network is deployed after Transmit/Receive duplex filters of the base station and before receive amplifiers in an uplink channel of the base station.

18. The method of claim 13, where the cross-coupling network comprises directional power coupling devices.

19. The method of claim 13, where the cross-coupling network is deployed in a RF processing section prior to power amplification stages for Downlink channel signals of the base station.

20. The method of claim 13, where the cross-coupling network is deployed in a RF processing section after amplification stages for Uplink channel signals of the base station.

* * * * *